(12) United States Patent
Ueki et al.

(10) Patent No.: US 9,071,832 B2
(45) Date of Patent: Jun. 30, 2015

(54) IMAGE PROCESSING DEVICE, IMAGE PROCESSING METHOD, AND IMAGE PROCESSING PROGRAM

(75) Inventors: Nobuo Ueki, Tokyo (JP); Hironori Mori, Kanagawa (JP); Takashi Kojima, Tokyo (JP); Yuki Tokizaki, Tokyo (JP); Kazuhiko Nishibori, Kanagawa (JP); Seiji Kimura, Chiba (JP)

(73) Assignee: Sony Corporation, Tokyo (JP)

( * ) Notice: Subject to any disclaimer, the term of this patent is extended or adjusted under 35 U.S.C. 154(b) by 523 days.

(21) Appl. No.: 13/542,141

(22) Filed: Jul. 5, 2012

(65) Prior Publication Data

US 2013/0063424 A1 Mar. 14, 2013

(30) Foreign Application Priority Data

Jul. 12, 2011 (JP) ................................. 2011-153555

(51) Int. Cl.
*H04N 13/02* (2006.01)
(52) U.S. Cl.
CPC .................................. *H04N 13/026* (2013.01)
(58) Field of Classification Search
CPC ......... G06T 19/00; G06T 17/20; G06T 17/00; G06T 15/10; G06T 15/005; G06T 11/001; G06T 11/40; G06T 11/60; G06T 7/0075; G06T 2207/10012; G06T 7/0022; H04N 13/0055; H04N 19/00769; H04N 13/0239; H04N 13/0059; H04N 13/0048; H04N 2013/0081
USPC ............................. 348/42; 382/154; 345/592
See application file for complete search history.

(56) References Cited

U.S. PATENT DOCUMENTS

| | | | | |
|---|---|---|---|---|
| 6,163,337 | A * | 12/2000 | Azuma et al. | 348/43 |
| 8,749,548 | B2 * | 6/2014 | Hong et al. | 345/419 |
| 2009/0015662 | A1 * | 1/2009 | Kim et al. | 348/43 |
| 2009/0022393 | A1 * | 1/2009 | Bar-Zohar et al. | 382/154 |
| 2009/0196492 | A1 * | 8/2009 | Jung et al. | 382/154 |
| 2010/0134516 | A1 * | 6/2010 | Cooper | 345/592 |
| 2012/0163701 | A1 * | 6/2012 | Gomi | 382/154 |
| 2012/0170833 | A1 * | 7/2012 | Kokojima et al. | 382/154 |

OTHER PUBLICATIONS

Matsumoto et al.; Advent of Glasses-Free 3d REGZA in First Year of New 3D TV Era, Toshiba Review, vol. 66, No. 5, pp. 2-5, (2011).

* cited by examiner

*Primary Examiner* — Sath V Perungavoor
*Assistant Examiner* — Howard D Brown, Jr.
(74) *Attorney, Agent, or Firm* — Sherr & Jiang, PLLC

(57) ABSTRACT

Provided is an image processing device including a congruence degree detecting unit which detects a degree of congruence of each of multiple scenes with respect to an input image made of a two-dimensional image, a depth image generating unit which generates, with respect to the input image, depth images each obtained by a technique corresponding to each of the scenes, a blending unit which blends the depth images, which are generated by the depth image generating unit and each generated by a technique corresponding to each of the scenes, at a blending ratio based on the degree of congruence of each of the scenes, to generate a blended depth image, and a three-dimensional image generating unit which generates a three-dimensional image, which can be viewed three-dimensionally, made of a left-eye image and a right-eye image generated by shifting each pixel of the input image using the blended depth image.

9 Claims, 13 Drawing Sheets

IMAGE PROCESSING DEVICE, IMAGE PROCESSING METHOD, AND IMAGE PROCESSING PROGRAM

BACKGROUND

The present disclosure relates to an image processing device, an image processing method and an image processing program, and more particularly, to an image processing device, an image processing method and an image processing program, capable of converting a two-dimensional image as an input image into a three-dimensional image made of a left-eye image and a right-eye image to stably realize three-dimensional visual effects.

In recent years, liquid crystal panels or plasma display panels (PDPs) configured to display three-dimensional images, which can be viewed three-dimensionally, have been widely provided so that viewers may view three-dimensional images. However, contents of three-dimensional image signals made of image signals for three-dimensional views, i.e., left-eye images and right-eye images, are insufficient. The insufficient contents have been compensated by a technology for converting typical two-dimensional image signals into quasi-three-dimensional image signals.

In general, the two-dimensional image signal is converted into the three-dimensional image signal based on the color or brightness of the two-dimensional image. Specifically, the left-eye image and the right-eye image are generated using parallax based on information on a depth image which is obtained by setting a depth as a pixel value of each pixel of the image.

Recently, there has been proposed a technology for converting a two-dimensional image into a more stereoscopic three-dimensional image based on depth images corresponding to scenes of each image which are estimated and classified (see TOSHIBA REVIEW Vol. 66 (2011)).

SUMMARY

However, the technology proposed in the non-patent document 1 may cause viewers to feel discomfort due to erroneous estimation and classification of scenes resulting in estimated depths that are completely different from actual depths.

In view of the foregoing situation, the present technology is directed to an image processing device, an image processing method and an image processing program, capable of converting a two-dimensional image as an input image into a three-dimensional image made of a left-eye image and a right-eye image to stably realize three-dimensional visual effects.

According to an embodiment of the present disclosure, there is provided an image processing device including a congruence degree detecting unit configured to detect a degree of congruence of each of a plurality of scenes with respect to an input image made of a two-dimensional image, a depth image generating unit configured to generate, with respect to the input image, depth images each obtained by a technique corresponding to each of the scenes, a blending unit configured to blend the depth images, which are generated by the depth image generating unit and each generated by a technique corresponding to each of the scenes, at a blending ratio based on the degree of congruence of each of the scenes, to generate a blended depth image, and a three-dimensional image generating unit configured to generate a three-dimensional image, which can be viewed three-dimensionally, made of a left-eye image and a right-eye image which are generated by shifting each of pixels of the input image using the blended depth image.

The image processing device may further include a supplemental information acquiring unit configured to acquire supplemental information of the input image, and a supplemental information weighting unit configured to apply a weight of each of the scenes to the degree of congruence of each of the scenes based on the supplemental information. Further, the blending unit may blend the depth images, which are generated by the depth image generating unit and each generated by a technique corresponding to each of the scenes, at a blending ratio based on the degree of congruence of each of the scenes which is weighted by the supplemental information weighting unit.

The supplemental information of the input image may be information on a program of the input image, which is included in an EPG (electronic program guide).

The image processing device may further include a stabilization unit configured to stabilize the degree of congruence of each of the scenes, which is weighted by the supplemental information weighting unit, in a time-axis direction. Further, the blending unit may blend the depth images, which are generated by the depth image generating unit and each generated by a technique corresponding to each of the scenes, at a blending ratio based on the degree of congruence of each of the scenes which is weighted by the supplemental information weighting unit and is further stabilized.

The stabilization unit may be an IIR (infinite impulse response) filter.

The image processing device may further include a normalization unit configured to normalize the degree of congruence of each of the scenes, which is detected by the congruence degree detecting unit. Further, the blending unit may blend the depth images, which are generated by the depth image generating unit and each generated by a technique corresponding to each of the scenes, at a blending ratio based on the degree of congruence of the respective scenes which is normalized by the normalization unit.

The blending unit may blend the depth images, which are generated by the depth image generating unit and each generated by a technique corresponding to each of the scenes, by obtaining a sum of products of the blending ratios, which are based on the degrees of congruence of each of the scenes which are normalized by the normalization unit, and the depth images, which are generated by the depth image generating unit and each generated by a technique corresponding to each of the scenes.

According to another embodiment of the present disclosure, there is provided an image processing method including detecting a degree of congruence of each of a plurality of scenes with respect to an input image made of a two-dimensional image, by a congruence degree detecting unit configured to detect a degree of congruence of each of a plurality of scenes with respect to the input image made of the two-dimensional image, generating, with respect to the input image, depth images each obtained by a technique corresponding to each of the scenes, by a depth image generating unit configured to generate, with respect to the input image, depth images each obtained by a technique corresponding to each of the scenes, blending the depth images, which are generated by performing the depth image generating step and each generated by a technique corresponding to each of the scenes, at a blending ratio based on the degree of congruence of each of the scenes, to generate a blended depth image, by a blending unit configured to blend the depth images, which are generated by the depth image generating unit and each generated by a technique corresponding to each of the scenes, at a blending ratio based on the degree of congruence of each of the scenes, to generate a blended depth image, and generating a three-dimensional image, which can be viewed three-dimensionally, made of a left-eye image and a right-eye image which are generated by shifting each of pixels of the input image using the blended depth image, by a three-dimensional image generating unit configured to generate a three-dimensional image, which can be viewed three-dimensionally, made of a left-eye image and a right-eye image which are generated by shifting each of pixels of the input image using the blended depth image.

According to another embodiment of the present disclosure, there is provided a program configured for a computer controlling an image processing device to execute processing, the image processing device including a congruence degree detecting unit configured to detect a degree of congruence of each of a plurality of scenes with respect to an input image made of a two-dimensional image, a depth image generating unit configured to generate, with respect to the input image, depth images each obtained by a technique corresponding to each of the scenes, a blending unit configured to blend the depth images, which are generated by the depth image generating unit and each generated by a technique corresponding to each of the scenes, at a blending ratio based on the degree of congruence of each of the scenes, to generate a blended depth image, and a three-dimensional image generating unit configured to generate a three-dimensional image, which can be viewed three-dimensionally, made of a left-eye image and a right-eye image which are generated by shifting each of pixels of the input image using the blended depth image, and the processing includes detecting, by the congruence degree detecting unit, a degree of congruence of each of a plurality of scenes with respect to the input image made of the two-dimensional image, generating, by the depth image generating unit, with respect to the input image, depth images each obtained by a technique corresponding to each of the scenes, blending, by the blending unit, the depth images, which are generated by performing the depth image generating step and each generated by a technique corresponding to each of the scenes, at a blending ratio based on the degree of congruence of each of the scenes, to generate a blended depth image, and generating, by the three-dimensional image generating unit, a three-dimensional image, which can be viewed three-dimensionally, made of a left-eye image and a right-eye image which are generated by shifting each of pixels of the input image using the blended depth image.

According to another embodiment of the present disclosure, a degree of congruence of each of a plurality of scenes is detected with respect to an input image made of a two-dimensional image, depth images each obtained by a technique corresponding to each of the scenes are generated with respect to the input image, the depth images each generated by a technique corresponding to each of the scenes are blended at a blending ratio based on the degree of congruence of each of the scenes to generate a blended depth image, and a three-dimensional image, which can be viewed three-dimensionally, made of a left-eye image and a right-eye image which are generated by shifting each of pixels of the input image using the blended depth image is generated.

The image processing device may be a separate entity or an image processing block.

According to the present technology, it is possible to convert a two-dimensional image as an input image into a three-dimensional image made of a left-eye image and a right-eye image to stably realize three-dimensional visual effects.

DETAILED DESCRIPTION OF THE EMBODIMENT(S)

Figure 1:
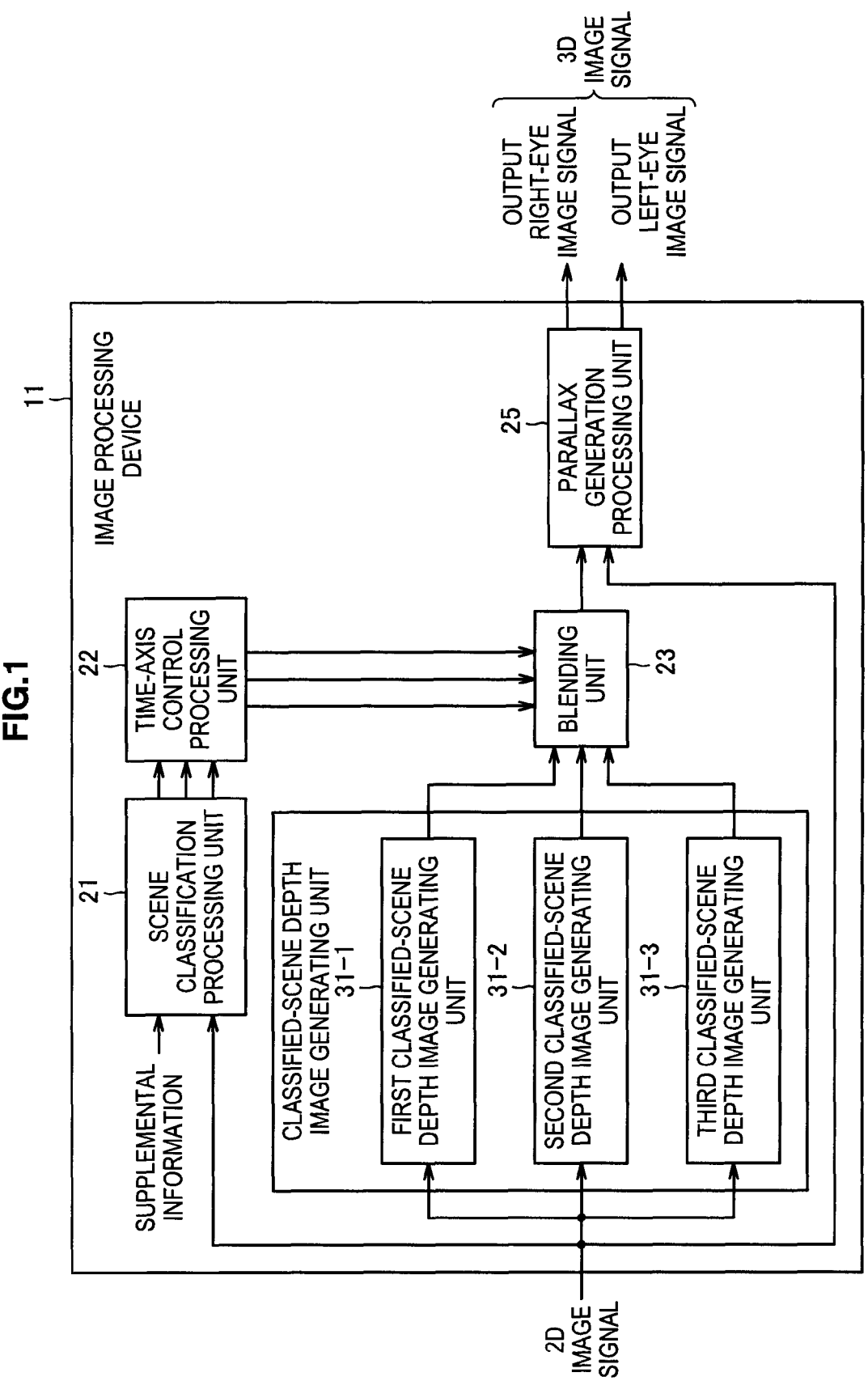
FIG. 1 is a view illustrating a structure of an image processing device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Structure of Image Processing Device According to an Embodiment of the Present Technology A structure of an image processing device according to an embodiment of the present technology will be described with reference to FIG. 1.

In FIG. 1, an image processing device 11 is configured to convert a two-dimensional image signal as an input image into a three-dimensional image signal to realize three-dimensional visual effects.

Specifically, the image processing device 11 includes a scene classification processing unit 21, a time-axis control processing unit 22, a blending unit 23, a classified-scene depth image generating unit 24, and a parallax generation processing unit 25.

The scene classification processing unit 21 is configured to calculate a degree of congruence that represents how well an image of an input image signal made of a two-dimensional image signal fits each of three types of scenes, i.e., each of first to third classified scenes. The scene classification processing unit 21 supplies the degree of congruence to the time-axis control processing unit 22. For example, the first to third classified scenes are a scene of a landscape image, a scene including a face image, and a scene of a motion image.

That is, the scene classification processing unit 21 detects a degree of congruence indicating how well the input image fits each of the three types of scenes. The structure of the scene classification processing unit 21 will be described in detail with reference to FIG. 2. The present embodiment describes the conversion of a two-dimensional image into a three-dimensional image using the three types of scenes. However, more than three types of scenes may be used for the conversion of the two-dimensional image into the three-dimensional image.

The time-axis control processing unit 22 is configured to stabilize the degree of congruence corresponding to each of the three types of scenes, which are supplied from the scene classification processing unit 21, with respect to a time axis, and to supply the stabilized degree of congruence as a blending ratio of each of the scenes to the blending unit 23. The structure of the time-axis control processing unit 22 will be described in detail with reference to FIG. 4.

The classified-scene depth image generating unit 24 is configured to generate depth images of the input image by a technique corresponding to each of the first to third classified scenes. The classified-scene depth image generating unit 24 supplies the depth images to the blending unit 23. In this embodiment, three types of depth images are generated by a technique corresponding to each of the first to third classified scenes. Specifically, the classified-scene depth image generating unit 24 includes first to third classified-scene depth image generating subunits 31-1 to 31-3. Each of the first to third classified-scene depth image generating subunits 31-1 to 31-3 generates a depth image of the input image by a technique corresponding to each of the first to third classified scenes and supplies the depth image to the blending unit 23. For example, if a scene is of an image of a face of a person, a face image is detected from an input image. In this case, a depth image of a face image, which is statistically obtained beforehand, may be read and applied to the detected face image to match the size or shape of the detected face image. For another example, if a scene is of a landscape image including the sky and the ground, a boundary between the sky and the ground is detected in an input image and a depth pattern of the ground and a depth pattern of the sky, which are previously obtained, may be added to the boundary. For another example, if a scene is of a motion image, a depth image may be generated using inter-pixel information of a plurality of consecutive frames.

The blending unit 23 is configured to blend the three types of depth images, which are supplied from the classified-scene depth image generating unit 24, into a single depth image based on a blending ratio of each of the classified scenes which is stabilized in the time-axis direction. The blending unit 23 supplies the blended depth image to the parallax generation processing unit 25. The structure of the blending unit 23 will be described in detail with reference to FIG. 5.

The parallax generation processing unit 25 is configured to add parallax information based on the depth image, which is supplied from the blending unit 23, to the two-dimensional image signal as the input image to generate a left-eye image signal and a right-eye image signal. The structure of the parallax generating processing unit 25 will be described in detail with reference to FIG. 6.

[Scene Classification Processing Unit]

Figure 2:
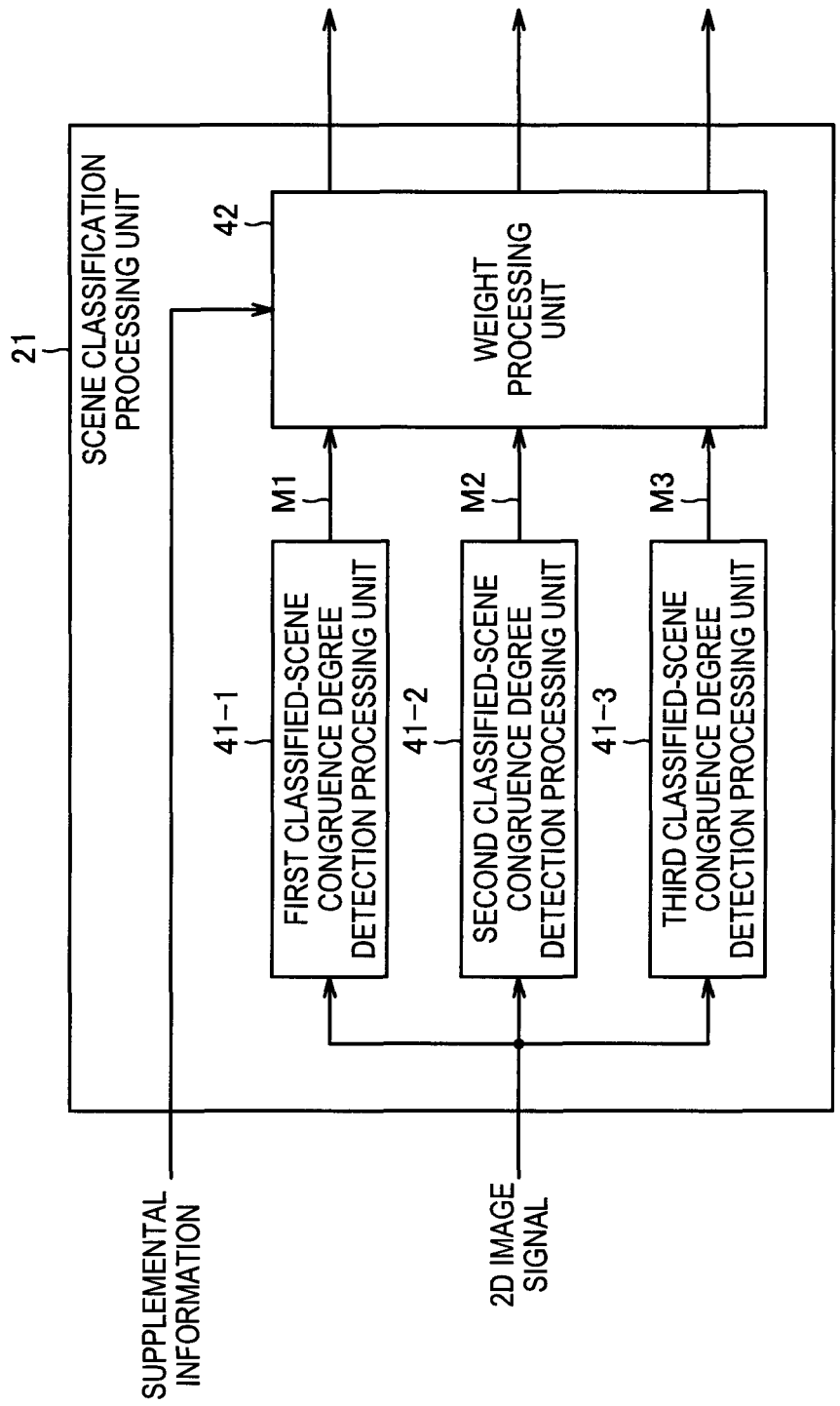
FIG. 2 is a view illustrating a structure of a scene classification processing unit in FIG. 1.

The structure of the scene classification processing unit 21 will be described in detail with reference to FIG. 2.

The scene classification processing unit 21 includes first to third classified-scene congruence degree detection processing units 41-1 to 41-3 and a weight processing unit 42. The first to third classified-scene congruence degree detection processing units 41-1 to 41-3 detect degrees of congruence M1 to M3 indicating how well an input image fits the first to third classified scenes. For example, it may be determined from a predetermined range of histograms on four corners of an image that the image is very likely to be a scene of a landscape image if a difference between histograms on the two upper corners of the image and a difference between histograms on the two lower corners are low and a difference between histograms on the two left corners of the image and a difference between histograms on the two right corners are high. In other words, this relation between the histograms may be obtained if the sky is positioned on the upper part of the image and the ground is positioned on the lower part of the image. In this case, it may be represented as a degree of congruence how much the distribution of the histograms on the four corners is similar to the configuration of the landscape image. Hereinafter, unless the first to third classified scenes or the first to third classified-scene congruence degree detection processing unit 41-1 to 41-3 have to be differentiated from each other, the first to third classified scenes or the first to third classified-scene congruence degree detection processing unit 41-1 to 41-3 will be referred to as the N-th classified scene or the N-th classified-scene congruence degree detection processing unit 41 (or 41-N), respectively. The other elements will be referred to likewise.

Figure 3:
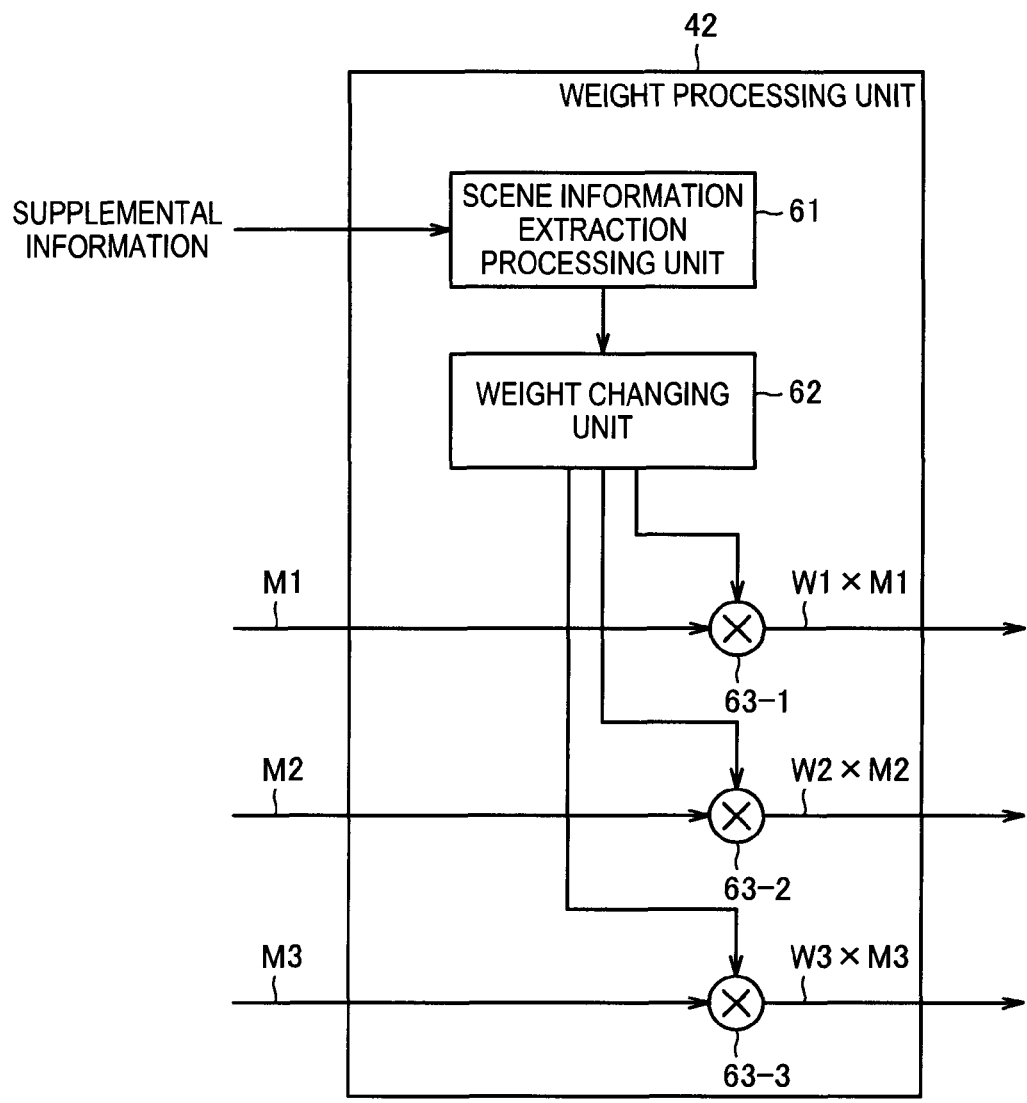
FIG. 3 is a view illustrating a structure of a weight processing unit in FIG. 1.

The weight processing unit 42 is configured to apply a weight to each of the first to third classified scenes based on supplemental information made of text information, such as EPG (electronic program guide), for a program including an input image. Specifically, referring to FIG. 3, the weight processing unit 42 includes a scene information extraction processing unit 61, a weight changing unit 62, and multiplier units 63-1 to 63-3. The scene information extraction processing unit 61 extracts information used in identifying a scene from supplemental information, such as EPG, of a program including an input image, and supplies the extracted information to the weight changing unit 62. The weight changing unit 62 obtains weights W1 to W3 based on the scene information, such as the number of keywords corresponding to the scene, which is supplied from the scene information extraction processing unit 61, and supplies the weights W1 to W3 to the multiplier units 63-1 to 63-3. The multiplier units 63-1 to 63-3 are configured to multiply the weights W1 to W3 by the degrees of congruence M1 to M3, respectively, and supply the products of the weights W1 to W2 and the degrees of congruence M1 to M3 as blending ratios to the time-axis control processing unit 22.

For example, it is assumed that the scene information extraction processing unit 61 extracts keywords, such as "travel" and "tour", from the supplemental information and supplies the keywords to the weight processing unit 42. If the first classified scene is of a landscape image, the weight processing unit 42 may determine from the keywords "travel" and "tour" that the program including the input image is very likely to have a lot of landscape images, set the weight W1 to more than one, and supply the weight W1 to the multiplier unit 63-1. In this case, the weight processing unit 42 sets the weights W2 and W3 of the second and third classified scenes to one and supplies the weights W2 and W3 of the second and third classified scenes to the multiplier units 63-2 and 63-3, respectively. Accordingly, it is possible to increase a weight only for a scene that is very likely to be related to the input image.

[Time-Axis Control Processing Unit]

Figure 4:
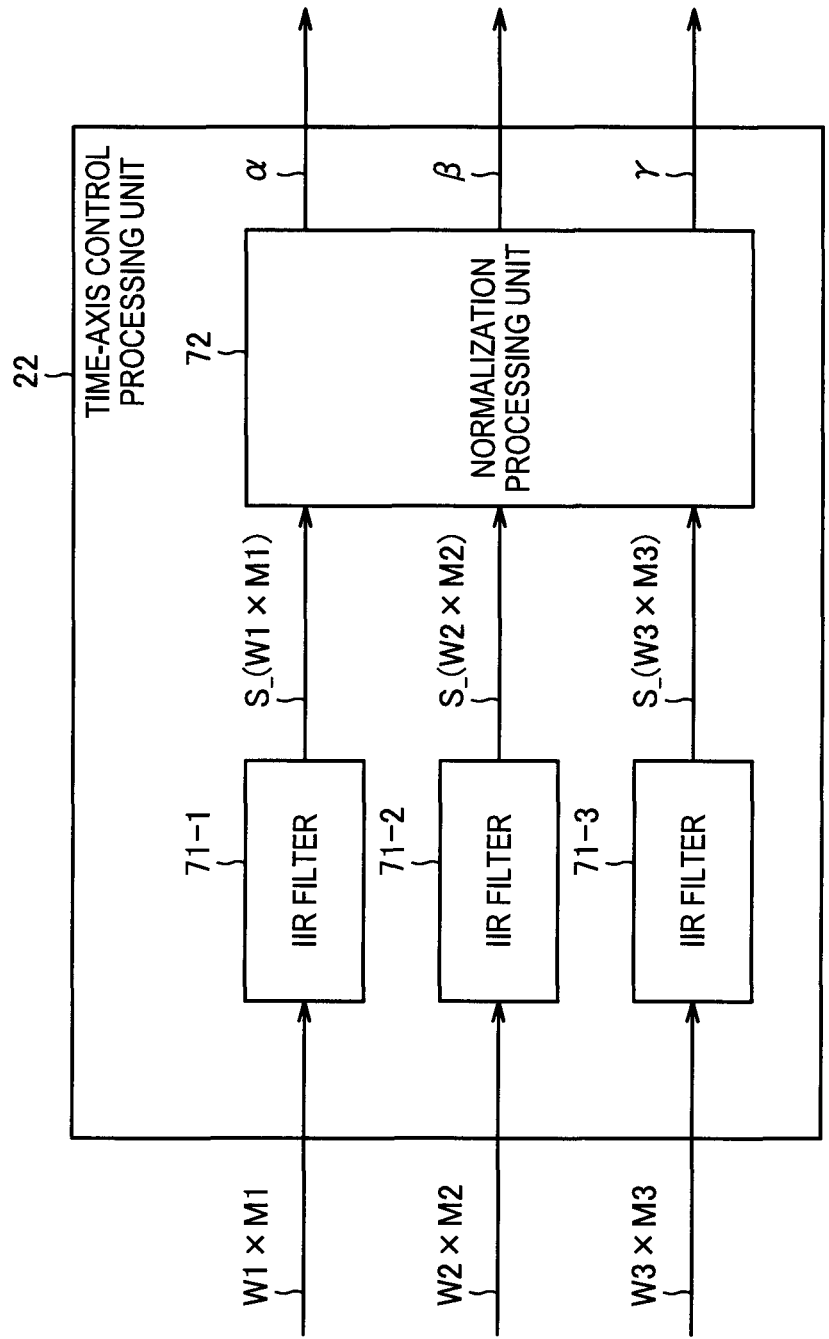
FIG. 4 is a view illustrating a structure of a time-axis control processing unit in FIG. 1.

The structure of the time-axis control processing unit 22 will be described in detail with reference to FIG. 4.

The time-axis control processing unit 22 includes IIR (infinite impulse response) filters 71-1 to 71-3 and a normalization processing unit 72. The BR filters 71-1 to 71-3 are configured to stabilize the degrees of congruence multiplied by the weights, which correspond to the first to third classified scenes, with respect to the time-axis direction. The IIR filters 71-1 to 71-3 supply the time-stabilized degrees of congruence S_(W1×M1) to S_(W3×M3) to the normalization processing unit 72. The normalization processing unit 72 is configured to normalize the sum of the degrees of congruence S_(W1×M1) to S_(W3×M3) to one. The normalization processing unit 72 supplies the normalized values as blending ratios $\alpha$, $\beta$, and $\gamma$ for the first to third classified scenes, respectively, to the blending unit 23.

[Blending Unit]

Figure 5:
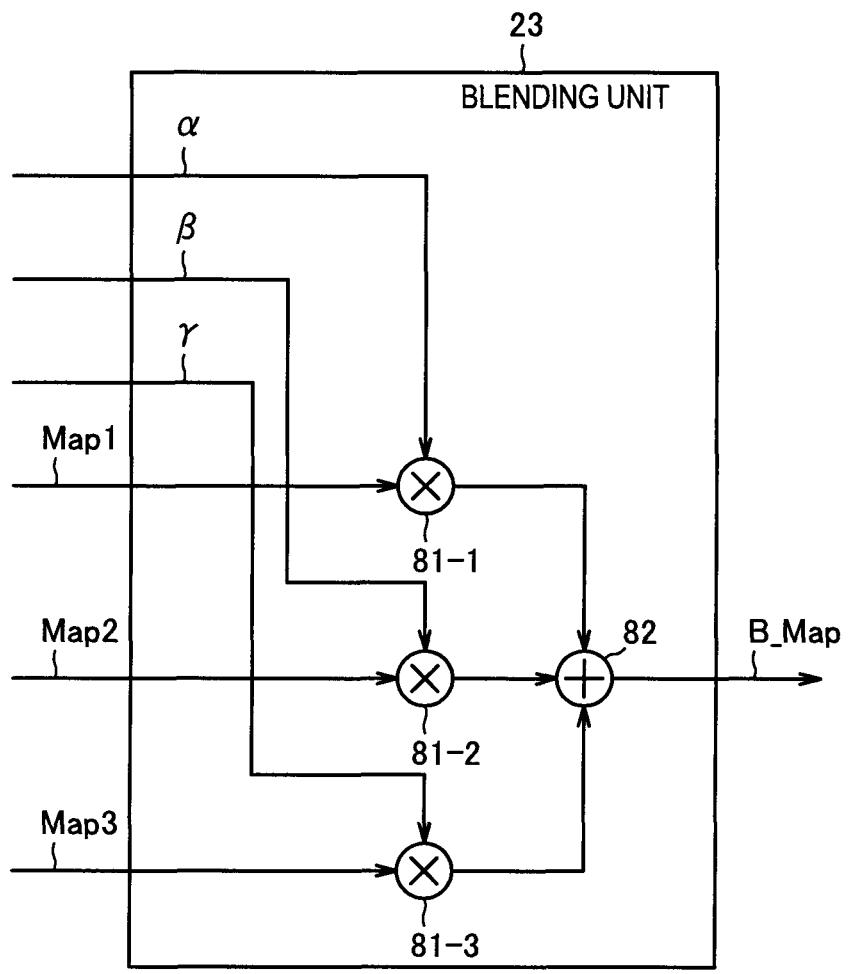
FIG. 5 is a view illustrating a structure of a blending unit in FIG. 1.

The structure of the blending unit 23 will be described in detail with reference to FIG. 5.

The blending unit 23 includes multiplier units 81-1 to 81-3 and an adder unit 82. The multiplier units 81-1 to 81-3 are configured to multiply pixels of depth images Map1 to Map3 corresponding respectively to the first to third classified scenes by the blending ratios $\alpha$, $\beta$, and $\gamma$ and output depth images $\alpha \times$Map1, $\beta \times$Map2, and $\gamma \times$Map3 to the adder unit 82. The adder unit 82 is configured to add these output image signals. Specifically, the adder unit 82 blends and combines the depth images Map1 to Map3, which are obtained by a technique corresponding to each of the first to third classified scenes, into a single depth image B-Map. The adder unit 82 supplies the depth image B-Map to the parallax generation processing unit 25.

[Parallax Generation Processing Unit]

Figure 6:
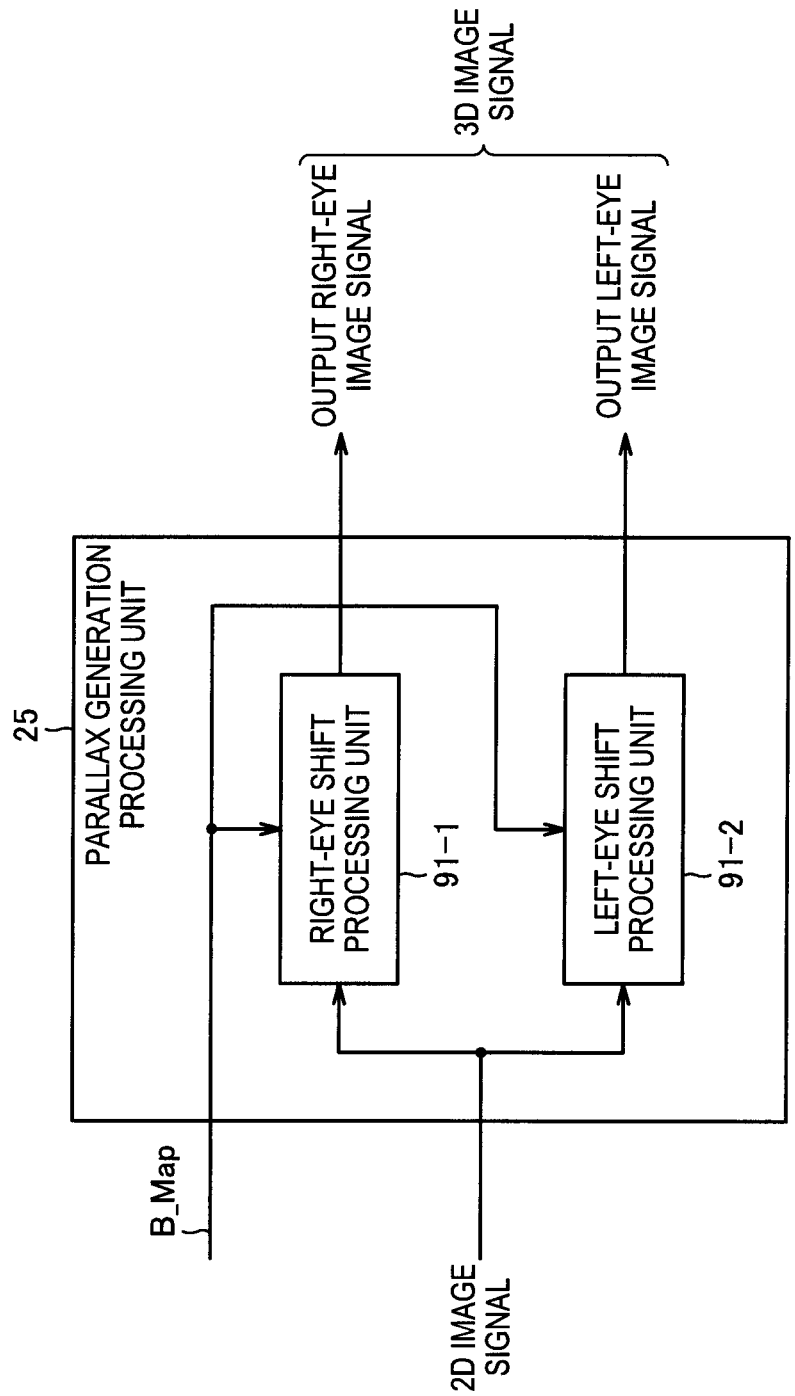
FIG. 6 is a view illustrating a structure of a parallax generation processing unit in FIG. 1.

The structure of the parallax generation processing unit 25 will be described in detail with reference to FIG. 6.

The parallax generation processing unit 25 includes a right-eye shift processing unit 91-1 and a left-eye shift processing unit 91-2. The right-eye shift processing unit 91-1 and the left-eye shift processing unit 91-2 are configured to shift pixels of the two-dimensional image signal as the input image for the right eye and the left eye, respectively, using information on pixels of the depth image B-Map as parallax information to generate a right-eye image and a left-eye image, respectively.

[2D-3D Image Conversion Process]

Figure 7:
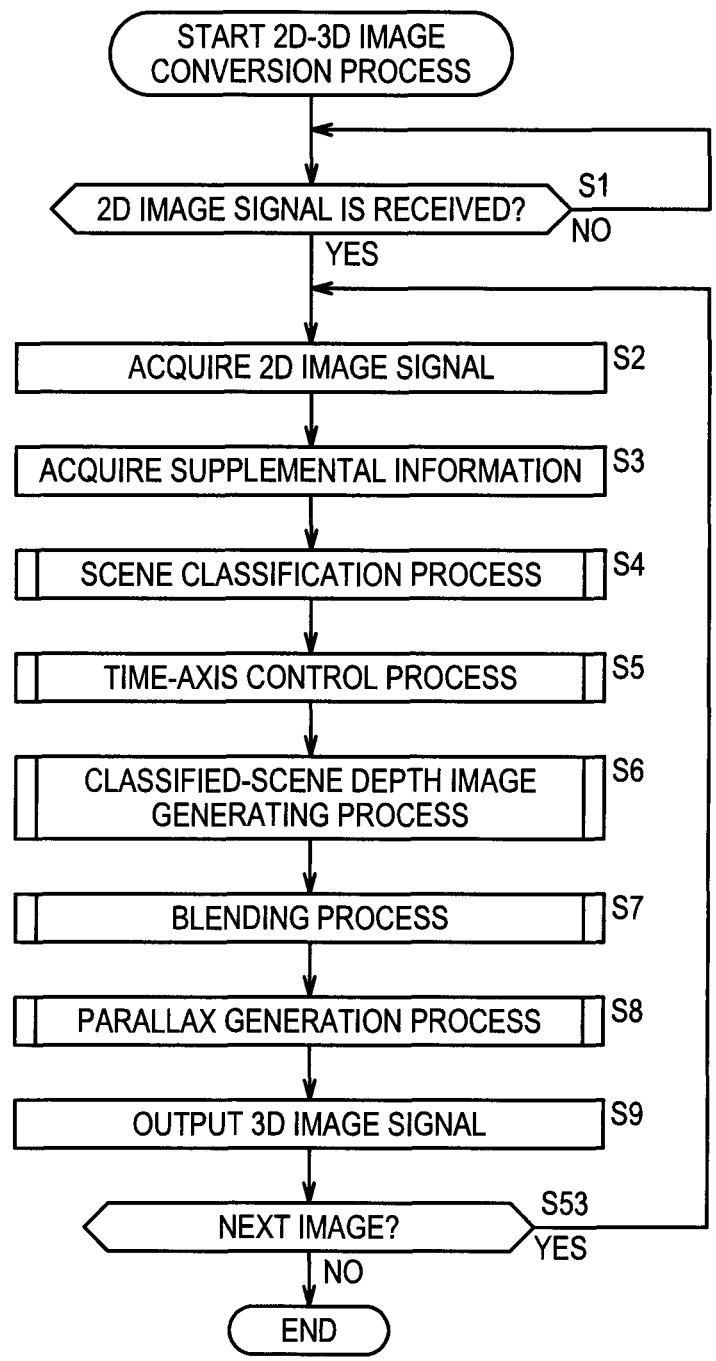
FIG. 7 is a flow chart illustrating a 2D-3D image conversion process by an image processing device in FIG. 1.

A 2D-3D image conversion process for converting a two-dimensional image signal as an input image to a three-dimensional image signal, which is performed in the image processing device 11, will be described with reference to the flow chart of FIG. 7.

In Step S1, the scene classification processing unit 21 determines whether or not a two-dimensional (2D) image signal of a broadcasting program, which is transmitted in a wireless or wired manner by broadcasting waves from a broadcasting station (not shown) and received by an antenna (not shown), is received. The scene classification processing unit 21 repeatedly performs Step S1 until the 2D image signal is received. If it is determined in Step S1 that the 2D image signal is received, the 2D-3D image conversion process proceeds to the next Step S2.

In Step S2, the scene classification processing unit 21 and the classified-scene depth image generating unit 24 acquire the 2D image signal. The acquired 2D image may be of either a single frame or a plurality of consecutive frames because of extracted characteristic factors which will be described.

In Step S3, the scene information extraction processing unit 61 of the weight processing unit 42 in the scene classification processing unit 21 reads text information of the EPG, which accompanies the 2D image signal, as supplemental information and supplies the supplemental information to the weight changing unit 62.

In Step S4, the scene classification processing unit 21 performs a scene classification process to obtain degrees of congruence of the 2D input image to each of the first to third classified scenes that are previously classified, and supplies the degrees of congruence of the 2D image to the time-axis control processing unit 22.

[Scene Classification Process]

Figure 8:
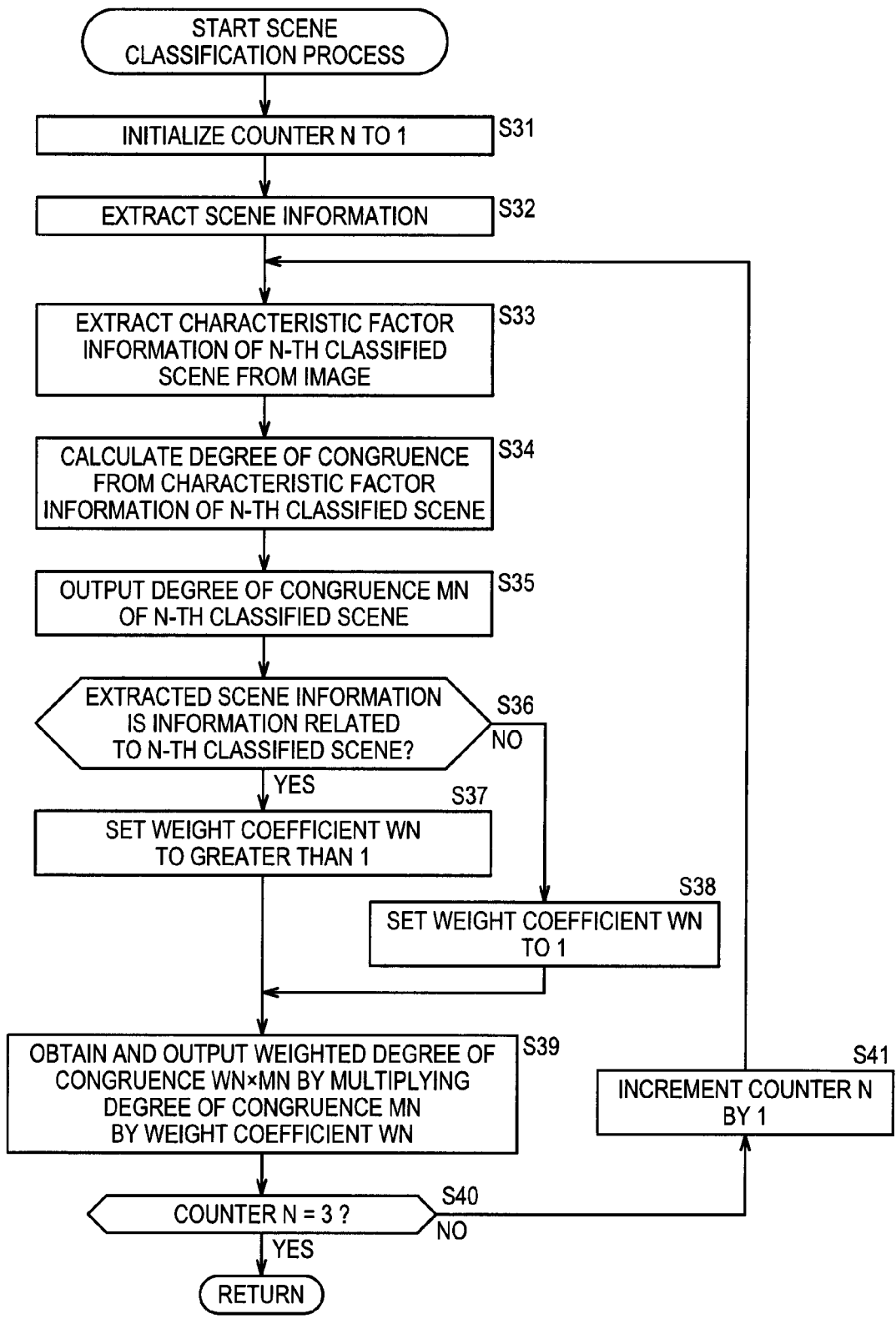
FIG. 8 is a flow chart illustrating a scene classification process.

The scene classification process will be described in detail with reference to the flow chart of FIG. 8.

In Step S31, the scene classification processing unit 21 initializes a counter N (not shown), which is used to identify the first to third classified scenes, to one.

In Step S32, the scene information extraction processing unit 61 of the weight processing unit 42 extracts scene information from the EPG information which accompanies the 2D image signal. In this case, the scene information refers to keywords related to the first to third classified scenes, which are included in the EPG information. In case of a scene of a landscape image, the scene information is a keyword indicating a program that is very likely to frequently show a landscape image, such as "travel" or "tour." In case of a scene of a face image, the scene information is a keyword indicating a program that is very likely to frequently show faces of players who play sports, such as "baseball" or "soccer." The scene information extraction processing unit 61 retrieves and extracts these keywords as the scene information and supplies the keywords to the weight changing unit 62.

In Step S33, the scene classification processing unit 21 controls an N-th classified-scene congruence degree detection processing unit 41 of the first to third classified-scene congruence degree detection processing units 41-1 to 41-3 to extract a characteristic factor used to identify an N-th classified scene. For example, if the N-th classified scene is a scene including a landscape image, the N-th classified-scene congruence degree detection processing unit 41 may extract histograms of pixels on four corners of the input image as the characteristic factor. For another example, if the N-th classified scene is a scene including a face image, the N-th classified-scene congruence degree detection processing unit 41 may retrieve and extract images of organs, such as eyes, nose, ears and mouth, of the face image in the input image as the characteristic factor. For another example, if the N-th classified scene is a scene made of a motion image, the N-th classified-scene congruence degree detection processing unit 41 may extract motion vectors, which may be obtained by block matching between corresponding pixels in a plurality of frames of the input image, as the characteristic factor.

In Step S34, the scene classification processing unit 21 controls the N-th classified-scene congruence degree detection processing unit 41 of the first to third classified-scene congruence degree detection processing units to detect the degree of congruence MN from the characteristic factor of each of the N-th classified scenes. For example, as described above, if the N-th classified scene is a scene of a landscape image, the N-th classified-scene congruence degree detection processing unit 41 may extract histograms within a predetermined range of four corners of the input image as the characteristic factor. In this case, if a difference between histograms on the two upper corners of the input image and a difference between histograms on the two lower corners of the input image are low and a difference between histograms on the two left corners of the input image and a difference between histograms on the two right corners of the input image are high, the N-th classified scene may be considered as being very likely to be a scene of a landscape image. In this case, for four types of characteristic factor, i.e., a low difference between histograms on the two upper corners, a low difference between histograms on the two lower corners, a high difference between histograms on the upper-right and lower-right corners, and a high difference between histograms on the upper-left and lower-left corners, the N-th classified-scene congruence degree detection processing unit 41 may obtain a degree of congruence of 100% if all of the four types of characteristic factor are satisfied, and a degree of congruence of 50% if two of the four types of characteristic factor are not satisfied.

In case of an N-th classified scene that is a scene of a face image, as described above, if organs of a face are frequently detected, the N-th classified scene may be considered as being very likely to be a face image. Assuming that the organs consist only of eyes, nose, mouth and ears, the N-th classified-scene congruence degree detection processing unit 41 may determine that the degree of congruence is 100% if the eyes, nose, mouth and ears are all detected, and that the degree of congruence is 50% if only two of the four organs are detected.

In Step S35, the N-th classified-scene congruence degree detection processing unit 41 outputs the detected degree of congruence MN to the weight processing unit 42.

In Step S36, the weight changing unit 62 determines whether or not the scene information is information related to the N-th classified scene. That is, for the N-th classified scene that is a scene of a landscape image, the scene information may be considered as related to the N-th classified scene if the scene information refers to a keyword indicating a program that is very likely to frequently show a landscape image, such as "tour" or "travel." On the other hand, for the N-th classified scene that is a scene of a face image, the scene information may be considered as related to the N-th classified scene if the scene information refers to a keyword indicating a program that is very likely to frequently show faces of players who play sports, such as "baseball" or "soccer." As such, if the scene information is considered as related to the N-th classified scene, the scene classification process proceeds to Step S37.

In Step S37, the weight changing unit 62 sets a weight coefficient WN to a value greater than one with respect to the degree of congruence of the N-th classified scene and outputs the weight coefficient WN to the multiplier unit 63-N.

If it is determined in Step S36 that the scene information is not related to the N-th classified scene, the weight changing unit 62 sets the weight coefficient WN to one with respect to the degree of congruence of the N-th classified scene in Step S38 and outputs the weight coefficient WN to the multiplier unit 63-N.

In Step S39, the multiplier unit 63-N multiplies the degree of congruence MN of the N-th classified scene by the supplied weight coefficient WN, and outputs the weighted degree of congruence WN×MN of the N-th classified scene.

In Step S40, the scene classification processing unit 21 determines whether or not the counter N is equal to three, i.e., whether or not the scene classification process is performed on all of the first to third classified scenes. If it is determined in Step S40 that the counter N is not equal to three, the scene classification process proceeds to Step S41.

In Step S41, the scene classification processing unit 21 increments the counter N by one and the scene classification process proceeds back to Step S33. That is, Steps S33 to S41 are repeatedly performed until it is determined that the scene classification process is performed on all of the first to third classified scenes. If it is determined in Step S40 that the counter N is equal to three, i.e., that the scene classification process is performed on the first to third classified scenes, the scene classification process is completed.

By the scene classification process, the degree of congruence MN of the input image to the N-th classified scene is obtained and at the same time the weight coefficient WN is set to a value greater than one if the scene information obtained from the supplemental information, such as EPG, is related to the N-th classified scene and the weight coefficient WN is set to one if the scene information is not related to the N-th classified scene. Accordingly, as the degree of congruence is high and the scene information is related closely to the N-th classified scene, the degree of congruence weighted with the greater weight coefficient WN is obtained.

Referring back to FIG. 7, the flow chart will be described.

If the scene classification process is completed in Step S4, the time-axis control processing unit 22 performs a time-axis control process in Step S5 to stabilize the degree of congruence weighted with the weight coefficient WN, WN×MN, in the time-axis direction with respect to each of the first to third classified scenes.

[Time-Axis Control Process]

Figure 9:
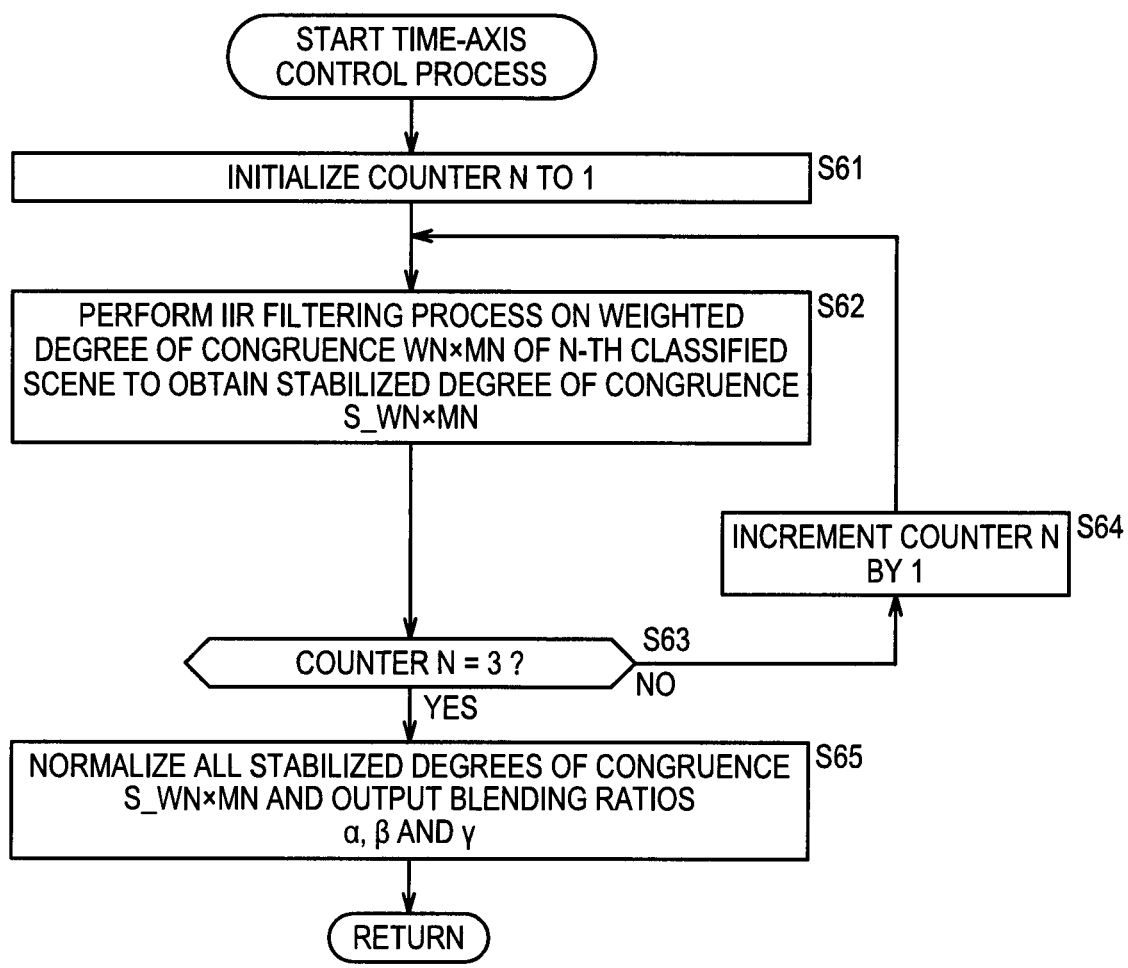
FIG. 9 is a flow chart illustrating a time-axis control process.

A time-axis control process will be described in detail with reference to the flow chart of FIG. 9.

In Step S61, the time-axis control processing unit 22 initializes the counter N (not shown) to one.

In Step S62, the IIR filter 71-N performs an IIR filtering process on the weighted degree of congruence WN×MN of the N-th classified scene to stabilize the weighted degree of congruence in the time-axis direction and outputs the stabilized weighted degree of congruence S_WN×MN of the N-th classified scene.

In Step S63, the time-axis control processing unit 22 determines whether or not the counter N is equal to three, i.e., whether or not the IIR filters perform the IIR filtering process on the weighted degrees of congruence WN×MN of all of the first to third classified scenes. If it is determined in Step S63 that the counter N is not equal to three, the time-axis control processing unit 22 increments the counter N by one in Step S64 and the time-axis control process proceeds back to Step S62. That is, Steps S62 to S64 are repeatedly performed until the IIR filtering process is performed on the weighted degrees of congruence WN×MN of all of the first to third classified scenes. If it is determined in Step S63 that the counter N is equal to three, i.e., that the IIR filtering process is performed on the weighted degrees of congruence WN×MN of all of the first to third classified scenes, the time-axis control process proceeds to Step S65.

In Step S65, the normalization processing unit 72 normalizes the stabilized weighted degrees of congruence S_WN× MN of the first to third N-th classified scenes, which are supplied from the IIR filters 71-1 to 71-3, into blending ratios α, β, and γ of the depth images Map1 to Map3 for the first to third classified scenes and supplies the blending ratios α, β, and γ to the blending unit 23.

By the time-axis control process, it is possible to stabilize the degree of congruence of the N-th classified scene which is weighted with the weight coefficient based on the scene information, WN×MN, in the time-axis direction, to calculate the blending ratios α, β, and γ of the depth images Map1 to Map3 of the first to third classified scenes, and to supply the blending ratios α, β, and γ to the blending unit 23.

Referring back to FIG. 7, the flow chart will be described.

After the time-axis control process is performed in Step S5, the classified-scene depth image generating unit 24 performs a classified-scene depth image generating process in Step S6 to generate a depth image in a different technique for each of the classified scenes. The classified-scene depth image generating unit 24 supplies the generated depth images to the blending unit 23.

[Classified-Scene Depth Image Generating Process]

Figure 10:
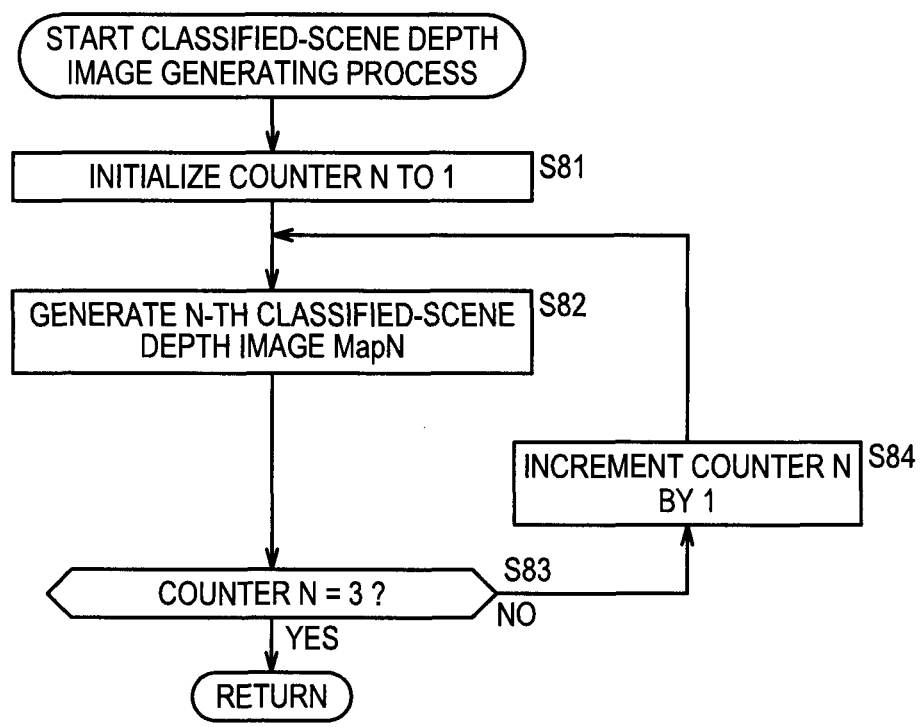
FIG. 10 is a flow chart illustrating a classified-scene depth image generation process.

A classified-scene depth image generating process will be described in detail with reference to the flow chart of FIG. 10.

In Step S81, the classified-scene depth image generating unit 24 initializes the counter N (not shown) to one.

In Step S82, the classified-scene depth image generating unit 24 controls the N-th classified-scene depth image generating unit 31-N to generate the N-th classified-scene depth image MapN and outputs the N-th classified-scene depth image MapN to the blending unit 23.

For example, if the N-th classified scene is a scene of a landscape image, the N-th classified-scene depth image generating unit 31-N reads a depth pattern including a baseline into a depth image based on information on the relation between a previously registered depth pattern including a baseline and a difference between histograms of pixels on four corners. The baseline refers to a boundary formed in a straight line within an image, such as a horizontal line or a boundary line between the ground and the building, where a depth is changed. In this embodiment, for images including the baseline as a scene of a landscape image, the relation between a depth pattern and a difference between histograms of pixels on four corners is previously obtained. In this case, a depth image is selected based on the difference between histograms of pixels on the four corners.

For example, if the N-th classified scene is a scene including a face image of a person, the N-th classified-scene depth image generating unit 31-N generates a depth image with respect to the scene including a face image by enlarging or reducing a previously registered depth pattern corresponding to a face image to fit the size of the supplied face image and applying the adjusted depth pattern.

For example, if the N-th classified scene is a scene including a face image of a person, the N-th classified-scene depth image generating unit 31-N generates a depth image with respect to the scene including the face image by enlarging or reducing a previously registered depth pattern corresponding to a face image to fit the size of a face image detected from the supplied image and applying the adjusted depth pattern.

For another example, if the N-th classified scene is a scene including a motion image, the N-th classified-scene depth image generating unit 31-N obtains motion vectors for each pixel based on a plurality of consecutive frames and forms clusters of the motion vectors. In this case, since each of the clusters is formed with respect to each object, an object covered by another object is located at the most inner side according to a motional relation, i.e., motion. The N-th classified-scene depth image generating unit 31-N obtains a relation of a relative depth direction by obtaining a square error of a motion vector between the object located at the most inner side and another object and generates a depth image based on the relation of relative depth direction.

In Step S83, the classified-scene depth image generating unit 24 determines whether or not the counter N is equal to three. That is, the classified-scene depth image generating unit 24 determines whether or not the counter N is equal to three, i.e., whether or not the depth images MapN are generated according to a technique of each of the first to third classified scenes and supplied to the blending unit 23. If it is not determined in Step S83 that the counter N is equal to three and depth images MapN are generated according to a technique of each of the first to third classified scenes and supplied to the blending unit 23, the classified-scene depth image generating process proceeds to Step S84.

In Step S84, the classified-scene depth image generating unit 24 increments the counter N by one and the classified-scene depth image generating process proceeds back to Step S82. That is, Steps S82 to S84 are repeatedly performed until the depth images MapN are generated according to the technique of each of the first to third classified scenes and supplied to the blending unit 23. If it is determined in Step S83 that the depth images MapN are generated according to the technique of each of the first to third classified scenes and supplied to the blending unit 23, the classified-scene depth image generating process is completed.

By the classified-scene depth image generating process, the depth images for the first to third classified scenes are generated according to the technique of each of the first to third classified scenes and are supplied to the blending unit 23.

Referring back to FIG. 7, the flow chart will be described.

After the classified-scene depth image generating process is performed in Step S6 to generate the depth images MapN according to the technique of each of the first to third classified scenes, the 2D-3D image conversion process proceeds to Step S7.

In Step S7, the blending unit 23 performs a blending process to blend the depth images for the N-th classified scenes, which are supplied from the classified-scene depth image generating unit 24, at the blending ratios $\alpha$, $\beta$, and $\gamma$ for the N-th classified scenes, which are supplied from the time-axis control processing unit 22. The blending unit 23 supplies the blended depth image to the parallax generation processing unit 25.

[Blending Process]

Figure 11:
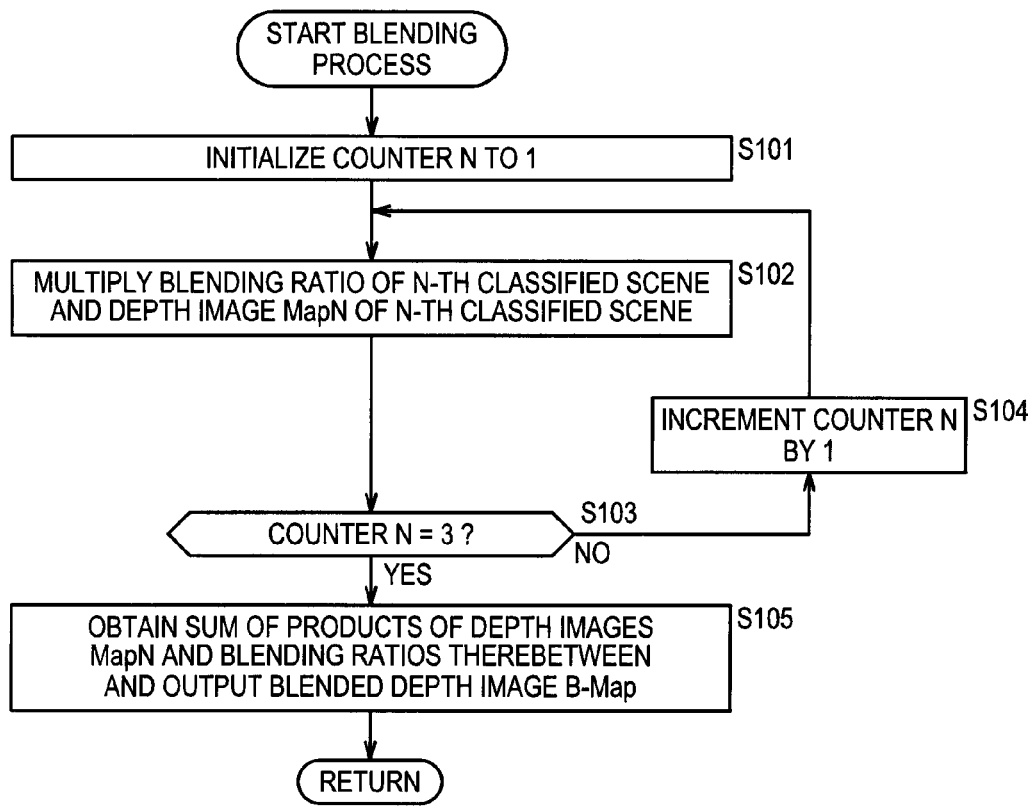
FIG. 11 is a flow chart illustrating a blending process.

A blending process will be described in detail with reference to the flow chart of FIG. 11.

In Step S101, the blending unit 23 initializes the counter N (not shown) to one.

In Step S102, the blending unit 23 multiplies the blending ratio of the N-th classified scene and each pixel of the depth image MapN of the N-th classified scene.

In Step S103, the blending unit 23 determines whether or not the counter N is equal to three. If it is not determined in Step S103 that the counter N is equal to three, i.e., the blending ratios of all of the N-th classified scenes are multiplied by pixel values of pixels of the depth images MapN of the N-th classified scenes, the blending process proceeds to Step S104.

The blending unit 23 increments the counter N by one in Step S104 and the blending process proceeds back to Step S102. That is, Steps S102 to S104 are repeatedly performed until it is determined that the blending ratios of all of the N-th classified scenes are multiplied by the pixel values of the pixels of the depth images MapN of the N-th classified scenes.

If it is determined in Step S103 that the counter N is equal to three and the blending ratios of the N-th classified scenes are multiplied by the pixel values of the pixels of the depth images MapN of the N-th classified scenes, the blending process proceeds to Step S105.

In Step S105, the blending unit 23 obtains the products of the pixel values of the pixels of each of the depth images MapN of the N-th classified scenes and the blending ratios of the N-th classified scenes and obtains the sum of the products on each of the pixels which are positioned at corresponding pixel positions. The blending unit 23 outputs a blended depth image B-Map, which consists of pixels each having the sum of the products as a pixel value, to the parallax generation processing unit 25.

By the blending process, it is possible to blend the depth images for the N-th classified scenes into the blended depth image B-Map by obtaining the sum of the products of the pixel values of the depth images for the N-th classified scenes and the blending ratios obtained by the degrees of congruence.

Referring back to FIG. 7, the flow chart will be described.

After the blended depth image B-Map is generated with respect to the input image in the blending process in Step S7 by blending the depth images for the N-th classified scenes, which are obtained according to the technique of each of the N-th classified scenes, at the blending ratios corresponding to the degrees of congruence, the 2D-3D image conversion process proceeds to Step S8.

In Step S8, the parallax generation processing unit 25 performs a parallax generation process to generate a left-eye image and a right-eye image due to parallax created by shifting each of the pixels of the two-dimensional image as the input image in left or right direction based on the depth value which corresponds to the pixel value of each of the pixels in the blended depth image B-Map.

[Parallax Generation Process]

Figure 12:
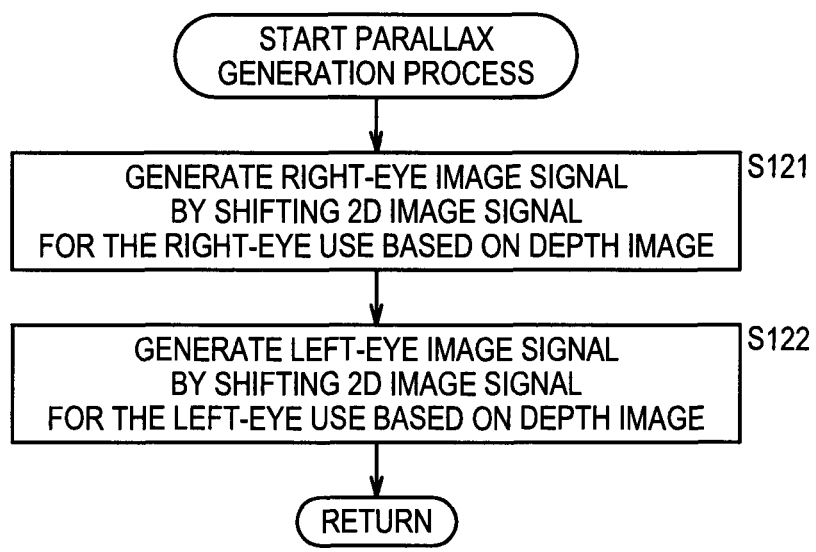
FIG. 12 is a flow chart illustrating a parallax generation process.

A parallax generation process will be described in detail with reference to a flow chart of FIG. 12.

In Step S121, the right-eye shift processing unit 91-1 generates a right-eye image by shifting each pixel of the 2D image as the input image in the left direction by a distance corresponding to a depth value at a corresponding pixel position in the blended depth image B-Map to provide right-eye parallax to the input image.

In Step S122, the left-eye shift processing unit 91-2 generates a left-eye image by shifting each pixel of the 2D image as the input image in the right direction by a distance corresponding to a depth value at a corresponding pixel position in the blended depth image B-Map to provide left-eye parallax to the input image.

By the parallax generation process, it is possible to generate the left-eye image and the right-eye image by shifting each of the pixels of the 2D image as the input image in right or left direction based on the depth value which corresponds to the pixel value of each of the pixels in the depth image which is positioned at a corresponding pixel position of each of the pixels in the 2D image as the input image.

Referring back to FIG. 7, the flow chart will be described.

After the parallax generation process is performed in Step S8 to generate the left-eye image and the right-eye image, the parallax generation processing unit 25 outputs the left-eye image and the right-eye image as a 3D image signal, which can be viewed three-dimensionally, in Step S9.

In Step S10, the classified-scene depth image generating unit 24 determines whether or not the next image is supplied. If it is determined in Step S10 that the next image is supplied, the 2D-3D image conversion process returns to Step S2 and repeats the subsequent operations. If it is determined in Step S10 that the next image is not supplied, the 2D-3D image conversion process is completed.

As such, since the depth images are individually generated for the classified scenes and are blended at the blending ratios based on the scene information and the degrees of congruence of the classified scenes to generate the blended depth image, it is possible to suppress unsatisfactory results due to falsely classified scenes. In this case, since the IIR filtering process is performed when the blending ratios are obtained, the blending ratios are stabilized in the time-axis direction, thereby stabilizing the generated depth image. Accordingly, it is possible to realize a 2D-3D image conversion process to provide a 3D image that is highly stable without causing viewers to feel discomfort.

As a result, according to the present technology, it is possible to generate a 3D image signal, which can be viewed three-dimensionally, made of a left-eye image and a right-eye image, which is stable without causing viewers to feel discomfort, from a 2D image signal.

The foregoing processes may not only be performed by hardware but also by software. If the processes are to be performed by software, programs of the software are installed through a recording medium in a computer including dedicated hardware or in a general-purpose personal computer executing a variety of functions by means of a variety of installed programs.

Figure 13:
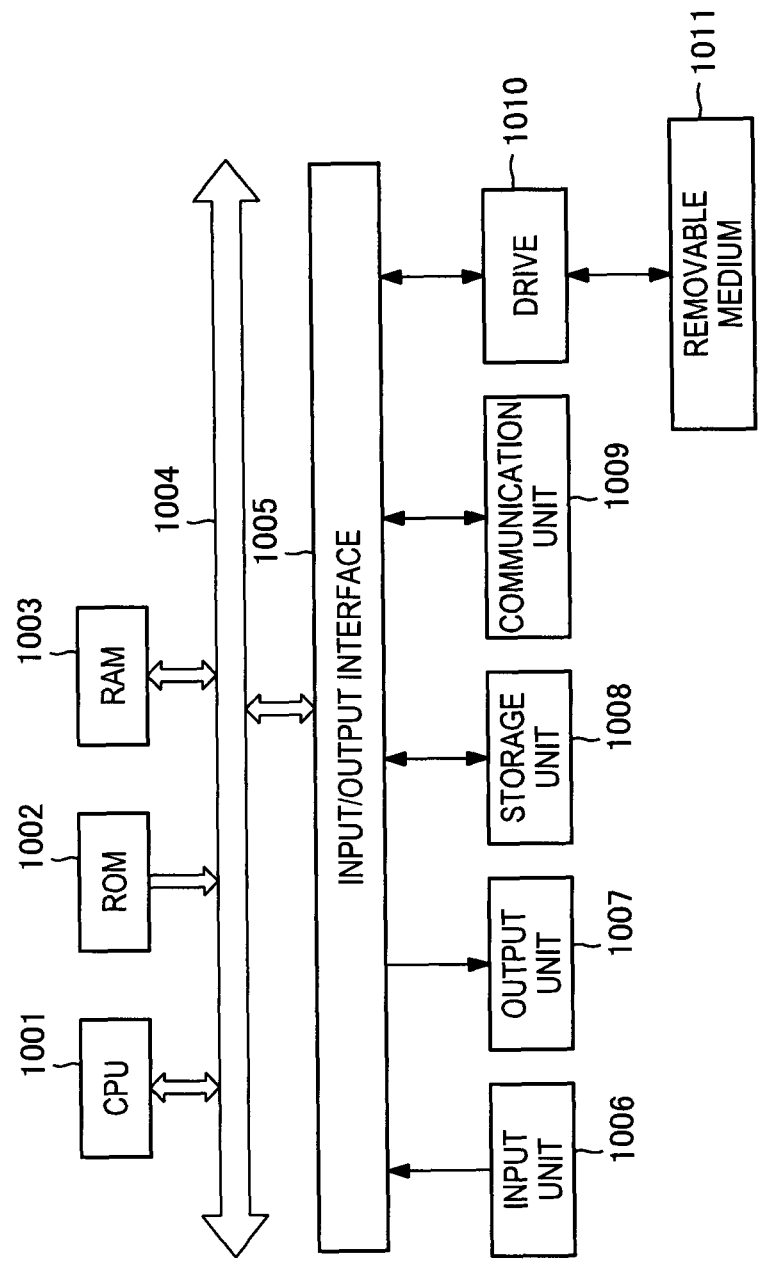
FIG. 13 is a view illustrating a structure of a general-purpose personal computer.

FIG. 13 illustrates the structure of a general-purpose personal computer. The personal computer includes a CPU (central processing unit) 1001. The CPU 1001 is connected to an input/output (I/O) interface 1005 through a bus 1004. The bus 1004 is connected to a ROM (read-only memory) 1002 and a RAM (random access memory) 1003.

The I/O interface 1005 is connected to an input unit 1006 made up of input devices, such as a keyboard and a mouse, used for a user to enter an operating command, an output unit 1007 outputting a process operating screen or a processing result image to a display device, a storage unit 1008 made up of a hard disc drive and the like storing programs or data, and a communication unit 1009 made up of LAN (local area network) adaptors to perform a communication process over a network such as the Internet. Further, the I/O interface 1005 is connected to a drive 1010 for reading or writing data from or to a removable medium 1011, such as a magnetic disc (including flexible disc), an optical disc (including CD-ROM (compact disc read-only memory) and DVD (digital versatile disc)), or a semiconductor memory.

The CPU 1001 performs a variety of processes according to programs, which are stored in the ROM 1002, or programs, which are read from the removable medium 1011, such as magnetic disc, optical disc, magneto-optical disc or semiconductor memory, are installed in the storage unit 1008, and are loaded from the storage unit 1008 into the RAM 1003. The RAM 1003 may further store data which is used for the CPU 1001 to perform a variety of processes.

It should be noted that in the present disclosure, steps describing programs recorded on recording media may be performed not only in time series in the described order but also in parallel or individually.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device including:

a congruence degree detecting unit configured to detect a degree of congruence of each of a plurality of scenes with respect to an input image made of a two-dimensional image;

a depth image generating unit configured to generate, with respect to the input image, depth images each obtained by a technique corresponding to each of the scenes;

a blending unit configured to blend the depth images, which are generated by the depth image generating unit and each generated by a technique corresponding to each of the scenes, at a blending ratio based on the degree of congruence of each of the scenes, to generate a blended depth image; and a three-dimensional image generating unit configured to generate a three-dimensional image, which can be viewed three-dimensionally, made of a left-eye image and a right-eye image which are generated by shifting each of pixels of the input image using the blended depth image.

(2) The image processing device according to (1), further including:
a supplemental information acquiring unit configured to acquire supplemental information of the input image; and
a supplemental information weighting unit configured to apply a weight of each of the scenes to the degree of congruence of each of the scenes based on the supplemental information,
wherein the blending unit blends the depth images, which are generated by the depth image generating unit and each generated by a technique corresponding to each of the scenes, at a blending ratio based on the degree of congruence of each of the scenes which is weighted by the supplemental information weighting unit.

(3) The image processing device according to (1) or (2),
wherein the supplemental information of the input image is information on a program of the input image, which is included in an EPG (electronic program guide).

(4) The image processing device according to any one of (1) to (3), further including:
a stabilization unit configured to stabilize the degree of congruence of each of the scenes, which is weighted by the supplemental information weighting unit, in a time-axis direction,
wherein the blending unit blends the depth images, which are generated by the depth image generating unit and each generated by a technique corresponding to each of the scenes, at a blending ratio based on the degree of congruence of each of the scenes which is weighted by the supplemental information weighting unit and is further stabilized.

(5) The image processing device according to (4),
wherein the stabilization unit is an IIR (infinite impulse response) filter.

(6) The image processing device according to any one of (1) to (5), further including:
a normalization unit configured to normalize the degree of congruence of each of the scenes, which is detected by the congruence degree detecting unit,
wherein the blending unit blends the depth images, which are generated by the depth image generating unit and each generated by a technique corresponding to each of the scenes, at a blending ratio based on the degree of congruence of each of the scenes which is normalized by the normalization unit.

(7) The image processing device according to (6),
wherein the blending unit blends the depth images, which are generated by the depth image generating unit and each generated by a technique corresponding to each of the scenes, by obtaining a sum of products of the blending ratios, which are based on the degrees of congruence of the respective scenes which are normalized by the normalization unit, and the depth images, which are generated by the depth image generating unit and each generated by a technique corresponding to each of the scenes.

(8) An image processing method including:
detecting a degree of congruence of each of a plurality of scenes with respect to an input image made of a two-dimensional image, by a congruence degree detecting unit configured to detect a degree of congruence of each of a plurality of scenes with respect to the input image made of the two-dimensional image;
generating, with respect to the input image, depth images each obtained by a technique corresponding to each of the scenes, by a depth image generating unit configured to generate, with respect to the input image, depth images each obtained by a technique corresponding to each of the scenes;
blending the depth images, which are generated by performing the depth image generating step and each generated by a technique corresponding to each of the scenes, at a blending ratio based on the degree of congruence of each of the scenes, to generate a blended depth image, by a blending unit configured to blend the depth images, which are generated by the depth image generating unit and each generated by a technique corresponding to each of the scenes, at a blending ratio based on the degree of congruence of each of the scenes, to generate a blended depth image; and
generating a three-dimensional image, which can be viewed three-dimensionally, made of a left-eye image and a right-eye image which are generated by shifting each of pixels of the input image using the blended depth image, by a three-dimensional image generating unit configured to generate a three-dimensional image, which can be viewed three-dimensionally, made of a left-eye image and a right-eye image which are generated by shifting each of pixels of the input image using the blended depth image.

(9) A program configured for a computer controlling an image processing device to execute processing,
wherein the image processing device includes:
a congruence degree detecting unit configured to detect a degree of congruence of each of a plurality of scenes with respect to an input image made of a two-dimensional image,
a depth image generating unit configured to generate, with respect to the input image, depth images each obtained by a technique corresponding to each of the scenes,
a blending unit configured to blend the depth images, which are generated by the depth image generating unit and each generated by a technique corresponding to each of the scenes, at a blending ratio based on the degree of congruence of each of the scenes, to generate a blended depth image, and
a three-dimensional image generating unit configured to generate a three-dimensional image, which can be viewed three-dimensionally, made of a left-eye image and a right-eye image which are generated by shifting each of pixels of the input image using the blended depth image, and
wherein the processing includes
detecting, by the congruence degree detecting unit, a degree of congruence of each of a plurality of scenes with respect to the input image made of the two-dimensional image,
generating, by the depth image generating unit, with respect to the input image, depth images each obtained by a technique corresponding to each of the scenes,
blending, by the blending unit, the depth images, which are generated by performing the depth image generating step and each generated by a technique corresponding to each of the scenes, at a blending ratio based on the degree of congruence of each of the scenes, to generate a blended depth image, and
generating, by the three-dimensional image generating unit, a three-dimensional image, which can be viewed three-dimensionally, made of a left-eye image and a right-eye image which are generated by shifting each of pixels of the input image using the blended depth image.

The present disclosure contains subject matter related to that disclosed in Japanese Priority Patent Application JP 2011-153555 filed in the Japan Patent Office on Jul. 12, 2011, the entire content of which is hereby incorporated by reference.

What is claimed is:

1. An image processing device comprising:
a congruence degree detecting unit configured to detect a degree of congruence of each of a plurality of scenes with respect to an input image made of a two-dimensional image;
a depth image generating unit configured to generate, with respect to the input image, depth images each obtained by a technique corresponding to each of the scenes;
a blending unit configured to blend the depth images, which are generated by the depth image generating unit and each generated by a technique corresponding to each of the scenes, at a blending ratio based on the degree of congruence of each of the scenes, to generate a blended depth image; and
a three-dimensional image generating unit configured to generate a three-dimensional image, which can be viewed three-dimensionally, made of a left-eye image and a right-eye image which are generated by shifting each of pixels of the input image using the blended depth image.

2. The image processing device according to claim 1, further comprising:
a supplemental information acquiring unit configured to acquire supplemental information of the input image; and
a supplemental information weighting unit configured to apply a weight of each of the scenes to the degree of congruence of each of the scenes based on the supplemental information,
wherein the blending unit blends the depth images, which are generated by the depth image generating unit and each generated by a technique corresponding to each of the scenes, at a blending ratio based on the degree of congruence of each of the scenes which is weighted by the supplemental information weighting unit.

3. The image processing device according to claim 2,
wherein the supplemental information of the input image is information on a program of the input image, which is included in an EPG (electronic program guide).

4. The image processing device according to claim 3, further comprising:
a stabilization unit configured to stabilize the degree of congruence of each of the scenes, which is weighted by the supplemental information weighting unit, in a time-axis direction,
wherein the blending unit blends the depth images, which are generated by the depth image generating unit and each generated by a technique corresponding to each of the scenes, at a blending ratio based on the degree of congruence of each of the scenes which is weighted by the supplemental information weighting unit and is further stabilized.

5. The image processing device according to claim 4,
wherein the stabilization unit is an IIR (infinite impulse response) filter.

6. The image processing device according to claim 1, further comprising:
a normalization unit configured to normalize the degree of congruence of each of the scenes, which is detected by the congruence degree detecting unit,
wherein the blending unit blends the depth images, which are generated by the depth image generating unit and each generated by a technique corresponding to each of the scenes, at a blending ratio based on the degree of congruence of each of the scenes which is normalized by the normalization unit.

7. The image processing device according to claim 6,
wherein the blending unit blends the depth images, which are generated by the depth image generating unit and each generated by a technique corresponding to each of the scenes, by obtaining a sum of products of the blending ratios, which are based on the degrees of congruence of the respective scenes which are normalized by the normalization unit, and the depth images, which are generated by the depth image generating unit and each generated by a technique corresponding to each of the scenes.

8. An image processing method comprising:
detecting a degree of congruence of each of a plurality of scenes with respect to an input image made of a two-dimensional image, by a congruence degree detecting unit configured to detect a degree of congruence of each of a plurality of scenes with respect to the input image made of the two-dimensional image;
generating, with respect to the input image, depth images each obtained by a technique corresponding to each of the scenes, by a depth image generating unit configured to generate, with respect to the input image, depth images each obtained by a technique corresponding to each of the scenes;
blending the depth images, which are generated by performing the depth image generating step and each generated by a technique corresponding to each of the scenes, at a blending ratio based on the degree of congruence of each of the scenes, to generate a blended depth image, by a blending unit configured to blend the depth images, which are generated by the depth image generating unit and each generated by a technique corresponding to each of the scenes, at a blending ratio based on the degree of congruence of each of the scenes, to generate a blended depth image; and
generating a three-dimensional image, which can be viewed three-dimensionally, made of a left-eye image and a right-eye image which are generated by shifting each of pixels of the input image using the blended depth image, by a three-dimensional image generating unit configured to generate a three-dimensional image, which can be viewed three-dimensionally, made of a left-eye image and a right-eye image which are generated by shifting each of pixels of the input image using the blended depth image.

9. A non-transitory computer-readable medium having embodied thereon a program, which when executed by a processor of an image processing device causes the processor to perform a method to execute processing, wherein the image processing device includes: a congruence degree detecting unit configured to detect a degree of congruence of each of a plurality of scenes with respect to an input image made of a two-dimensional image, a depth image generating unit configured to generate, with respect to the input image, depth images each obtained by a technique corresponding to each of the scenes, a blending unit configured to blend the depth images, which are generated by the depth image generating unit and each generated by a technique corresponding to each of the scenes, at a blending ratio based on the degree of congruence of each of the scenes, to generate a blended depth image, and a three-dimensional image generating unit configured to generate a three-dimensional image, which can be viewed three-dimensionally, made of a left-eye image and a right-eye image which are generated by shifting each of pixels of the input image using the blended depth image, and wherein the processing includes detecting, by the congruence degree detecting unit, a degree of congruence of each of a plurality of scenes with respect to the input image made of the two-dimensional image, generating, by the depth image generating unit, with respect to the input image, depth images each obtained by a technique corresponding to each of the scenes, blending, by the blending unit, the depth images, which are generated by performing the depth image generating step and each generated by a technique corresponding to each of the scenes, at a blending ratio based on the degree of congruence of each of the scenes, to generate a blended depth image, and generating, by the three-dimensional image generating unit, a three-dimensional image, which can be viewed three-dimensionally, made of a left-eye image and a right-eye image which are generated by shifting each of pixels of the input image using the blended depth image.

* * * * *